US 9,021,243 B2

(12) United States Patent
Itoh (10) Patent No.: US 9,021,243 B2
(45) Date of Patent: Apr. 28, 2015

(54) METHOD FOR INCREASING FREE MEMORY AMOUNT OF MAIN MEMORY AND COMPUTER THEREFORE (75) Inventor: Hiroshi Itoh, Sagamihara (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 322 days.

(21) Appl. No.: 13/564,521

(22) Filed: Aug. 1, 2012

(65) Prior Publication Data

US 2013/0036299 A1  Feb. 7, 2013

(30) Foreign Application Priority Data

Aug. 2, 2011 (JP) ................................. 2011-168902

(51) Int. Cl.
G06F 9/00 (2006.01)
G06F 9/44 (2006.01)
G06F 12/08 (2006.01)

(52) U.S. Cl.
CPC .............. *G06F 9/4401* (2013.01); *G06F 12/08* (2013.01)

(58) Field of Classification Search
CPC .......... G06F 9/44; G06F 9/4401; G06F 12/00
USPC ......................................................... 713/1, 2
See application file for complete search history.

(56) References Cited

U.S. PATENT DOCUMENTS

| 5,696,897 | A | * | 12/1997 | Dong | ............................... 714/15 |
| 6,633,968 | B2 | | 10/2003 | Zwiegincew et al. | |
| 8,499,143 | B2 | * | 7/2013 | Itoh et al. | ........................... 713/2 |
| 2002/0122076 | A1 | * | 9/2002 | Nakaki | ......................... 345/847 |
| 2006/0277402 | A1 | * | 12/2006 | Wakabayashi | ..................... 713/1 |
| 2011/0320747 | A1 | * | 12/2011 | Madisetti et al. | ............. 711/154 |

FOREIGN PATENT DOCUMENTS

| JP | 57-169987 | 10/1982 |
| JP | 05-020201 | 1/1993 |
| JP | 10/031624 | 2/1998 |
| JP | 2011-103093 | 5/2011 |

OTHER PUBLICATIONS

David Solomon et al., "Microsoft Windows Internals, Forth Edition: Microsoft Windows Server 2003, Windows XP, and Windows 2000.", Third printing in Sep. 18, 2007.

* cited by examiner

*Primary Examiner* — Chun Cao
(74) *Attorney, Agent, or Firm* — Kunzler Law Group (57) ABSTRACT

For increasing a free memory amount, a computer is provided with a main memory and a virtual memory area. Working sets having a predetermined size in a main memory are allocated to virtual address spaces. The area from which working sets are removed is a free memory area, and a cache area is set to a part of the area. During booting, a predetermined process not affecting the booting is suspended. The size of the working set of the suspended process is decreased by swapping out the memory page into the virtual memory area. As a result, the size of the free memory area increases, and along therewith, the OS increases the size of a cache area, thus enabling more boot files to be read ahead and reducing the boot time.

19 Claims, 7 Drawing Sheets

METHOD FOR INCREASING FREE MEMORY AMOUNT OF MAIN MEMORY AND COMPUTER THEREFORE

CROSS-REFERENCE TO RELATED APPLICATIONS

This application is a national patent application and claims priority to Japanese Patent Application Number 2011-168902 entitled "METHOD OF INCREASING FREE MEMORY AMOUNT OF MAIN MEMORY AND COMPUTER THEREFOR" and filed on 2 Aug. 2011 for Hiroshi Itoh, which is incorporated herein by reference.

FIELD

The present invention relates to a technique for increasing the free memory amount of a main memory, and more particularly to a technique for increasing the free memory amount while preventing an influence on boot processing of a computer.

BACKGROUND

After a computer has been switched on, the computer starts a boot process (hereinafter, referred to as "the boot") for reading a predetermined program (hereinafter, referred to as "the boot file") from a boot disk to a main memory. This enables a user to run application programs (hereinafter, referred to as "the applications") for operation after a series of boot files are loaded. At the time of starting to use the computer, the boot processing is completed in a short time because the size of the boot files is relatively small. However, after the computer has been used for many years, the user might have installed various programs therein. These programs have been incorporated into the boot files and run automatically without the user's knowledge. As a result, the boot time is increased.

Patent Document 1 describes prefetching for reducing the start time by omitting wasteful page faults and seeks. The prefetching is a function of checking the access status of the files to a hard disk drive (HDD) by tracing the behavior of the program being booted during the last boot and earlier boots and then reading a predetermined file ahead into a cache area of the main memory during the next boot and subsequent boots on the basis of the result. An access log is recorded for each file and stored in a predetermined directory.

Each file includes records of data of access patterns to the HDD for each program. During booting, the files are read ahead into the main memory on the basis of the access log. The recent operating systems (OS) of Windows® further has a function called SuperFetch, derived by developing the prefetching disclosed in Patent Document 1. The SuperFetch function helps manage a problem introduced by virus scans and disk optimizations. Normally, during a period of time when the user is not operating the computer, an application's memory page will be swapped out from a cache area after a virus scan and disk optimization is performed. The Super-Fetch function copes with this problem by swapping-in the swapped-out memory page after the completion of the virus scan and disk optimization.

Patent Document 2 discloses a technique for reducing the boot time. The technique was invented by the inventor of the present invention and assigned to the applicant of the present invention. In the invention described in Patent Document 2, processes of a boot file that do not affect the operation of a computer, even in the case of being run on-demand, are suspended temporarily during booting and then resumed on-demand after a completion of the boot. As a result, this enables a reduction in the number of boot files automatically executed after being loaded, which reduces the boot time while preventing problems such as boot delay and stagnation.

Patent Document 3 discloses a virtual storage management system in a working-set method. The virtual storage management system dynamically sets a cache memory space in the main memory by using an unused page of another working set. Further, Patent Document 4 discloses a technique in which a user sets or changes the priority of paging-out a memory page to control working sets in units of a job. Finally, Non-patent Document 1 describes a method of managing a working set in Windows®.

Patent Document 1—U.S. Pat. No. 6,633,968
Patent Document 2—Japanese Patent Application Laid-Open No. 2011-103093
Patent Document 3—Japanese Patent Application Laid-Open No. Hei 5-20201
Patent Document 4—Japanese Patent Application Laid-Open No. Hei 10-31624
Non-patent Document 1—Inside Microsoft Windows®, Fourth Edition, vol. 1, Microsoft official practical guide, Nikkei BP Soft Press

SUMMARY

The prefetching described in Patent Document 1 reduces the boot time by decreasing the frequency of I/O access to a HDD, which reduces the seek time. The invention in Patent Document 2 reduces the boot time by increasing the processor time allocated to necessary boot files and stopping unnecessary boot files from running during booting. These techniques reduce the boot time according to principles different from each other, and therefore their functions can be implemented in a situation where the techniques exist in the same system.

The size of the boot files able to be read ahead in prefetching, however, is limited in a cache area of the main memory. The OS does not know how many working sets are necessary for a generated process and therefore is not able to increase a cache area by setting a different working set size for each process. Non-patent Document 1 describes an OS that allocates a default maximum working set size to all processes generated anew.

In this case, the process is able to use a new memory page within a range of the maximum working set size. In the case of a page fault, the OS checks the capacity of a free memory area (free memory amount) to which no working set is allocated. If the free memory amount is large, the OS adds a memory page to an area having a size equal to or greater than the default maximum working set size. If the free memory amount is small, the OS allocates a newly required memory page to a free area. The newly required memory page is obtained by swapping out a memory page selected according to a Least Recently Used (LRU) algorithm into a virtual memory configured in the disk drive.

Furthermore, in the case where a page fault frequently occurs because the free memory amount becomes scarce, or in the case of a shortage of physical memory for a new process, the OS starts a process called working set trimming to secure a physical memory amount for necessary processes. In working set trimming, the OS assigns priorities to all the processes, using criteria for judgment such as whether a process exceeds a minimum working set size or whether a process has been in the idle state for a long period of time. The OS then deletes memory pages in the physical memory from the process having the highest priority.

In this operation, the OS deletes memory pages using a minimum standard, such as a range of a physical memory amount necessary for the newly generated process or an acceptable range of a page fault. In this manner, the OS manages all working sets according to a generation status of the page fault and the current free memory amount, which optimizes the efficient use of a physical memory relative to all the processes.

Meantime, the OS uses a part of the free memory area as a cache area for prefetching. The capacity of the cache area increases as the free memory amount increases and therefore more boot files can be read ahead. The OS, however, cannot determine the content of a process and thus has no other choice but to control the maximum working set size to obtain optimized paging as a whole, ignoring the individual characteristics of the individual processes. Accordingly, in the working set trimming, the free memory amount cannot be increased in a positive manner.

The invention disclosed in Patent Document 2 suspends some low priority processes selected from the processes used to load a boot file during booting. Working sets having a certain size, however, are allocated to the suspended processes, which causes a decrease in the free memory amount. The suspended processes are not run until the processes are resumed. Therefore, even if swapping out the memory pages decreases the working set size, and the working sets allocated to the suspended processes are formed into a virtual memory, the decrease does not interfere with boot processing.

Therefore, the object of the present invention is to provide a method of increasing the free memory amount of a main memory. Another object of the present invention is to provide a method of reducing boot time. Still another object of the present invention is to provide a computer program for implementing the method and a computer for performing the method.

A computer according to the present invention is provided with a storage device, with a boot file stored therein, a main memory, and an operating system. Immediately after the computer starts to boot, processes for loading the boot file into the main memory are generated. The operating system allocates working sets having a predetermined size, set by default, to the generated processes. A predetermined process selected out of the processes for loading the boot file is suspended. A memory page of the suspended process is swapped out to decrease the working set size.

With the above configuration, the present invention is able to increase the free memory amount. The operating system decreases the working set size in a more positive manner than the working set trimming, while not affecting booting. The predetermined process to be suspended may include a process run on-demand in response to a user's operation. Further, the predetermined process may include a process for loading a program not run during booting among all programs registered with a registry.

The memory page of the suspended process does not cause a page fault, even if it is entirely swapped out, until it is resumed. Therefore, the working set size is preferably as small as possible, within a range allowed by the operating system. In the present invention, the decreased working set size may be a minimum working set size set by default to each process by the operating system. Furthermore, the working set size may be zero as long as the operating system allows it.

If the operating system increases the size of a cache area configured in the main memory according to the decreased working set size, the cache area can be used more effectively. The operating system is able to use the cache area for reading ahead the boot file or for reading a file after booting.

Although the memory page of the suspended process may be previously paged out, so as not to be read from the processor during suspension, it is preferable to prevent an occurrence of a page fault during running of the process. In the present invention, the swapped-out memory page can be swapped in before the suspended process resumes or before the processor accesses the memory page. In the case of swapping in the memory page, the decreased working set size can be increased to the maximum working set size.

The swap-in timing may be after elapse of a certain period of time after the process is suspended or when the boot is completed. Alternatively, the swap-in timing may be when the caller process is generated with reference to an interprocess communication list describing a relation between the caller process and the callee process with respect to the memory page of the suspended callee process. A code within a predetermined range for processing a window message can be swapped in by sending a window message to a process having a window handle. In this case, the swap-in timing can be immediately after the process is suspended.

According to the present invention, it is possible to provide a method of increasing a free memory amount of a main memory. Moreover, according to the present invention, it is possible to provide a method of reducing the boot time. Still further, according to the present invention, it is possible to provide a computer program for implementing the method and a computer for performing the method.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

[Configuration of Computer System]

Figure 1:
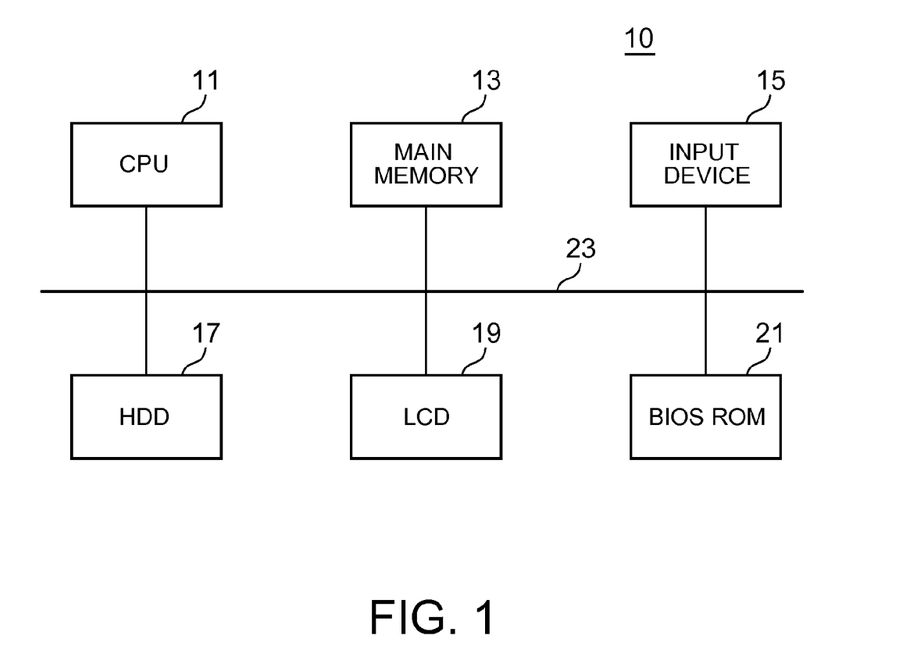
FIG. 1 is a functional block diagram illustrating the main hardware configuration of a computer system according to the present embodiment.

FIG. 1 is a functional block diagram illustrating the main hardware configuration of a computer system 10 according to the present embodiment. The computer system 10 includes a CPU 11, a main memory 13, an input device 15, a hard disk drive (HDD) 17, a liquid crystal display (LCD) 19, a BIOS ROM 21, each being connected to a bus 23. The HDD 17 is a boot disk storing a boot file. The HDD 17 also includes a storage area for providing the main memory 13 with a virtual memory. Descriptions for functions of the above-mentioned hardware devices are omitted because they are well known with respect to the present embodiment.

[Definitions]

Terms used in the present specification are defined. A boot file means a program, a program module, a code, a file, or the like that is automatically loaded into a main memory after a computer is switched on for start. The boot file includes a program automatically run and a program run on-demand after the loading. Therefore, the boot file does not include a program loaded on-demand at the time of running.

Here, the completion of a boot process can be determined based on a CPU usage rate of the entire computer being lowered to a predetermined value. By using a predetermined program, the CPU usage rate Y of the entire computer can be calculated by the following formula: $Y=(1-(Ui+Ki)/Et)\times 100\%$, where Ui denotes a user mode time of an idle process, Ki denotes a kernel mode time of the idle process, and Et denotes an elapsed time.

Running a process means a state where, in an operating system (OS) performing preemptive multitasking, a process for running a program involves transitions between a run state and a ready state. A suspend state of a process means a state where a process for running a program is out of a run state or a ready state because a specific Application Program Interface (API) function is called and the process does not transition to a ready state unless a specific API function for resume is called.

A not-run process is a process that is not yet generated to load a program or a process that is not yet generated for running a program that has been loaded. Although both a process in a suspend state and a not-run process are not run, the process in a suspend state is run once and can be resumed when it is called from another process. Therefore a process in a suspend state can be distinguished from a not-run process.

[Configuration of Software]

Figure 2:
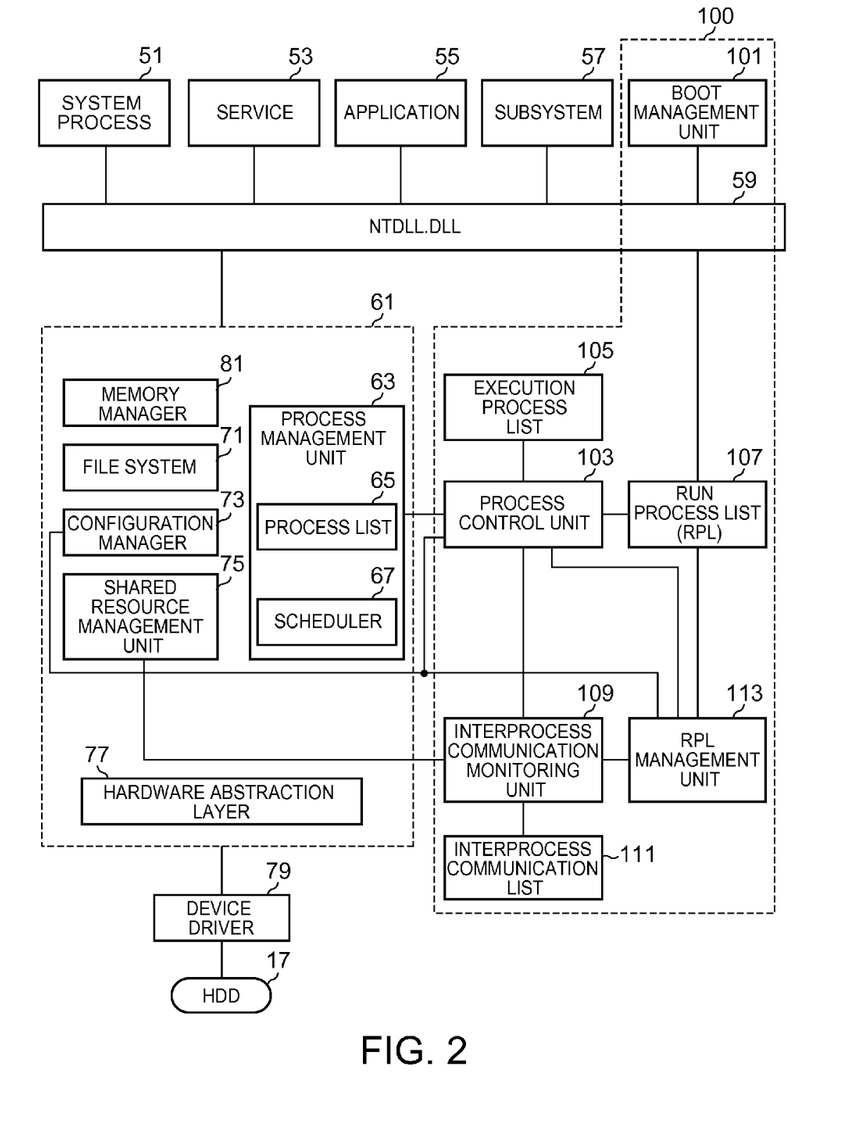
FIG. 2 is a functional block diagram illustrating a software configuration for constructing an operating environment according to the present embodiment.

FIG. 2 is a functional block diagram illustrating a software configuration for configuring an operating environment according to the present embodiment. The OS corresponds to multitasking and reads ahead a boot file by using a cache area of the main memory 13 during booting and adjusts the cache area according to the size of the free memory amount. As the OS described above, Windows® can be exemplified. Functions of the composition elements illustrated in FIG. 2 are implemented in the computer 10 when programs stored in the HDD 17 have been loaded into the main memory 13 during booting and are run by the CPU 11.

In FIG. 2, the elements other than a boot system 100 are well-known. A system process 51 includes a session manager, Winlogon, a service control manager, and the like. A service 53 is a process operating in the background without any operation by a user, including Service.exe, SpoolSv.exe, WinMgt.exe, and the like. An application 55 includes a user application, Explorer, Task Manager, and the like.

A subsystem 57 is configured with an environment subsystem process, a kernel mode device driver, a subsystem DLL, and the like. An NTDLL.DLL 59 is a support library that provides a function for using the subsystem DLL, configured with an interface function (System Service Dispatch Stub) that can be called from a user mode and an internal support function which the sub system DLL uses. A kernel 61 is a basic component of the well-known OS, including a process management unit 63, a file system 71, a configuration manager 73, a shared resource management unit 75, a hardware abstraction layer 77, a memory manager 81, and the like.

The process management unit 63 includes a process list 65 and a process scheduler 67. The process management unit manages generation, run, standby, and suspension of a process and a thread. The process list 65 provides a list of processes that are currently generated in the computer 10. The process scheduler 67 causes a generated process to transition between a run state (RUN) and a ready state (READY) according to a predetermined algorithm to perform preemptive task switch.

The file system 71 generates a File Allocation Table (FAT) and a directory to manage recording, reading, deleting, or moving files with respect to the HDD 17. The file system 71 reads ahead data of the HDD 17 referenced lately into the main memory 13, and includes a cache manager that speeds up the subsequent I/O processing. Before loading any boot files, the cache manager reads ahead the boot files to be subsequently loaded, which have been recognized until the last boot, into the cache area of the main memory 13. The file system 71 references the cache area when loading the boot file. If there is any read-ahead boot file in the cache area, the file system 71 starts loading from the boot file.

The configuration manager 73 manages a system registry and startup. The system registry registers information on a process that automatically runs without a user's operations during booting. The startup registers components of the OS for which a user selects running or stopping of booting. Processes registered with the registry and in the startup are auto-run (AutoRun) by OS Shell Startup during booting.

The shared resource management unit 75 manages shared resources used for interprocess communication. The interprocess communication is a mechanism to perform exchange of information between processes each provided with a unique virtual address space and can use various methods including message queues, socket pipes, shared memory, and the like. A shared resource can be configured as follows: for example, in a shared area of the main memory 13 formed with a CreatePipe function, data written by a certain process that calls a WriteFile function is read by another process that calls a ReadFile function. The hardware abstraction layer 77 absorbs discrepancies in the hardware platform for abstraction.

The memory manager 81 converts a virtual address provided to a process to a physical address of the main memory 13 and performs paging processing between the main memory 13 and a virtual memory area of the HDD 17 with respect to a memory page requested or referenced by a thread belonging to the process. The memory manager 81 sets the size of a working set and dynamically changes the size of the working set on the basis of the size of the free memory amount and the status where a page fault occurs for the memory page. The memory manager 81 is requested from a process control unit 103 to dynamically change the size of the working set of the process.

The boot system 100 includes the boot management unit 101, a process control unit 103, an execution process list 105, a run process list (RPL) 107, an interprocess communication monitoring unit 109, an interprocess communication list 111, and an RPL management unit 113. The boot management unit 101 constitutes a part of the user application 55, and provides the user with information on a run process and a configuration screen to edit the RPL 107.

When detecting a process that is not registered with the RPL 107 in the process list 65, the process control unit 103 calls an API function and suspends the process through the process scheduler 67. The process control unit 103 calls an API function with respect to a process notified of by the interprocess communication monitoring unit 109 and resumes the suspended process. When the process control unit 103 detects a process that runs the suspended process, the process control unit 103 resumes the process. Furthermore, the process control unit 103 is able to resume a process that has been suspended for a certain period of time or resumes a process that was suspended at the completion of the boot.

After suspending a predetermined process, the process control unit 103 requests the memory manager 81 to decrease the working set size of the suspended process. In resuming the suspended process, the process control unit 103 is able to request the memory manager 81 to increase the decreased working set size to the maximum working set size that has been set by default.

The execution process list 105 is a list of all processes run by the computer 10 in the boot. A run process transitions between a run state and a ready state. The execution process list 105 can be a list of types of processes including a process that is never run after the program is installed, a process that is run only immediately after the installation, a process that is never run within the latest one week, and a process that is never started within the latest ten boots. The RPL 107 is a list registering identifiers of processes that are permitted to run or that are not suspended among a plurality of processes loading a boot file. A method of generating the RPL 107 will be described in detail below with reference to FIG. 5.

The interprocess communication monitoring unit 109 monitors interprocess communication performed via the shared resource management unit 75 and registers a dependence of processes, including a caller process and a callee process, with the interprocess communication list 111. The dependence of processes is information indicating, for example, when processes B, C, and D are to be called for the running of process A, association of the running of process A and processes B, C, and D.

As described later, the registration of process dependence has an advantage that, when process A is run during suspension of processes B, C and D, processes B, C and D can be resumed earlier than detection of interprocess communication, in which the shared resource management unit 75 calls processes B, C, and D, thus reducing the running time. The RPL management unit 113, with the RPL 107, registers the minimum required processes to boot the OS based on the actual usage of the computer 10 by a user.

[Process Transition]

Figure 3:
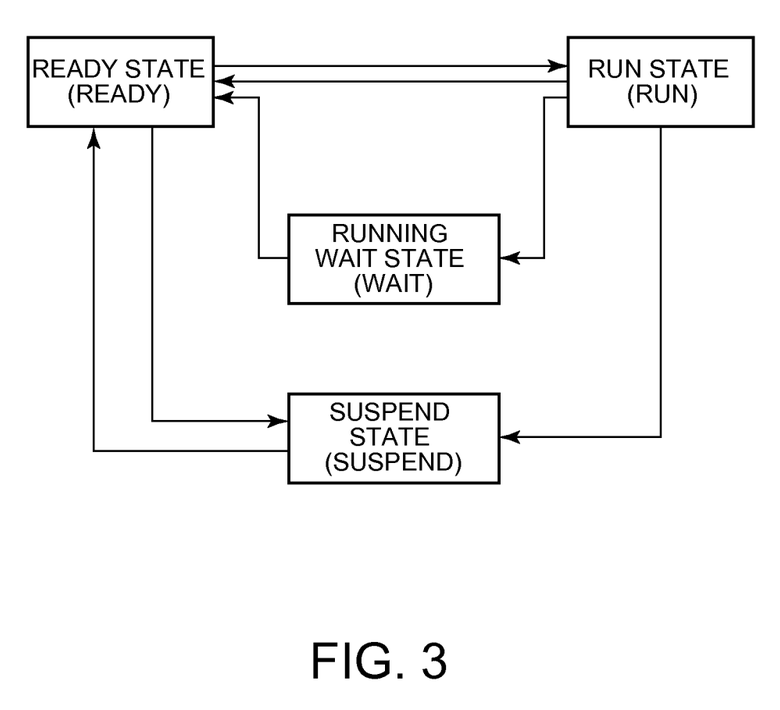
FIG. 3 is a diagram illustrating a state of a process generated by a computer where the process is controlled by a process management unit for transition before termination.

FIG. 3 illustrates a state of a process generated by the computer 10 where the process is controlled by the process management unit 63 for transition before termination. The process is a data structure called a process control block (PCB) including a processor state, process priority, time slice information, a process ID, device information, and the like. The processor state is information on a state of a register, a stack, a program counter, and the like. When the CPU 11 stops the process, this is also referred to as a context.

The process priority is information indicating priority of a context switch among processes. The time slice information is information on an initial value of time slice and the remaining time. The time slice is a maximum running time allowed for a process when the process obtains one execution right for the CPU 11. The process ID is a unique number allocated to each process. The device information is identification information of a device allocated to the process. The PCB may contain other various types of information depending on the OS.

The run state (RUN) is a state where a process is currently run by the CPU 11, and after consuming the allocated time slice, the state transitions to a ready state (READY). The ready state (READY) is a state where the process is ready and waits for running in the order of priority, where the process scheduler 67 dispatches PCBs registered in a ready queue to the CPU 11 in a predetermined order. The running wait state (WAIT) is a state where the process waits for running by calling a function stopping the running by itself until a certain condition such as I/O is established. The suspend state (SUSPEND) is a state where the process is forced to be placed in a wait state by another process.

In order for a certain process to make another process transition from a run state or a ready state to a suspend state, or resumed from a suspend state to transition to a ready state, a specific API function may be called. At this time, in the case where the OS does not provide an API function to directly suspend or resume a process, an API function covering all threads generated by the process as a target of suspending and resuming can be called to implement suspending or resuming.

Figure 4:
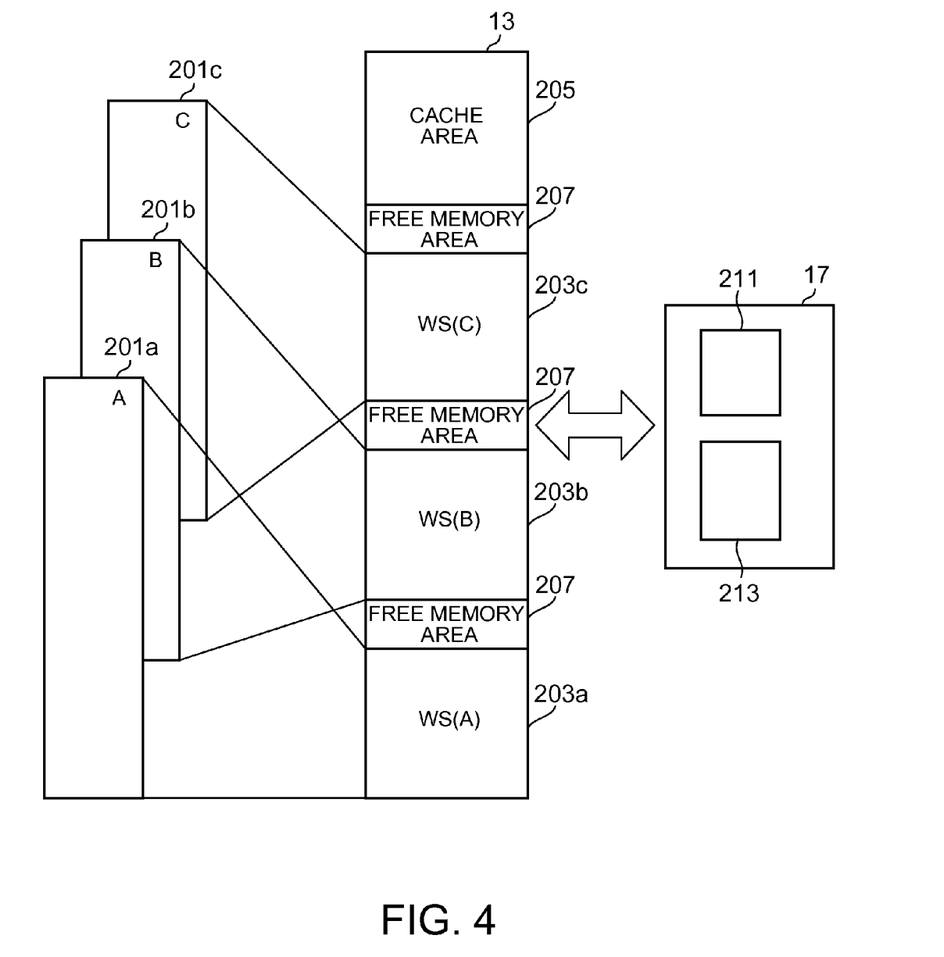
FIG. 4 is a diagram describing a state of a working set controlled in a main memory.

FIG. 4 is a diagram describing a relationship between a working set expanded in the main memory 13 and a cache area. The memory manager 81 provides each process with a virtual address space composed of continuous addresses. The size of the virtual address space depends on the architecture of the CPU 11, and the size is 4 Gbytes in a 32-bit CPU. The memory manager 81 manages the main memory by using a paging method and makes a virtual address space with a plurality of pages. FIG. 4 exemplifies three virtual address spaces 201a to 201c. Each of the virtual address spaces 201a to 201c includes three segments: text, data, and stack. The text segment stores an execution file.

The memory manager 81 allocates a working set to a newly generated process in the main memory 13. The working set is a set of memory pages resident in the main memory 13. For a thread for running a process, the main memory 13 can be used without causing a page fault as long as it remains within a range of a working set. FIG. 4 illustrates a state where the working sets 203a to 203c are allocated in such a way as to correspond to the virtual address spaces 201a to 201c.

The working sets 203a to 203c include segments corresponding to the segments of the virtual address spaces 201a to 201c. These segments are also composed of pages having the same size as the pages of the virtual address spaces 201a to 201c. An array of memory pages forming a text segment and a data segment in each of the working sets 203a to 203c does not need to be continuous like the virtual address spaces 201a to 201c. The memory manager 81 maps the virtual addresses in the virtual address spaces 201a to 201c and the physical addresses in the main memory 13 according to the page table stored in the main memory 13. A memory management unit (MPU), incorporated in the CPU 11 or prepared independently, dynamically converts virtual addresses to physical addresses.

The memory manager 81 sets the maximum working set size and the minimum working set size as default values to a working set of a newly generated process in units of a byte or in units of a page. The HDD 17 includes a general storage area 211 for storing an image of a boot file and a virtual memory area 213 for storing a paging file.

A working set allocated to a specific process cannot be used by another process. The maximum working set size determines the amount of physical memory used by the process. A difference between the maximum working set size and the memory page actually used by the process is an unused memory page. Although the memory manager 81 always secures the memory page having the minimum working set size in the main memory 13, even in the case where a new process is generated or a free memory amount is scarce, the memory manager 81 may swap out a memory page exceeding the minimum working set size depending on the condition of the scarce free memory amount.

When a thread belonging to a process requests a new memory page, the memory manager 81 secures a requested memory page by using an unused memory page, if any, or by swapping out an in-use memory page into the virtual memory area 213 according to a predetermined algorithm if the memory page exceeds the maximum working set size. While the process operates within a range of a default working set size in principle, the process is able to request the memory manager 81 for a larger working set if necessary.

The process generally does not request the memory manager 81 to decrease a working set size that has been increased once. In the case where a working set cannot be allocated to a new process because the capacity of the main memory 13 is scarce, however, the memory manager 81 forcibly and moderately decreases the maximum working set size of any one of the working sets according to the LRU algorithm.

Even in the case where the maximum working set size is decreased, a memory page having the minimum working set is secured for the process. The size of a cache area 205 corresponds to the working set size allocated to the cache manager of the file system 71. A storage area excluding the working sets 203a to 203c and the cache area 205 from the entire main memory 13 corresponds to a free memory area 207.

The memory manager 81 sets the size of the cache area 205 within the range of the free memory area 207 corresponding to a difference between the capacity of the main memory 13 and the total of the maximum working set sizes of the working sets. Specifically, the cache area 205 forms a part of the free memory area 207 and the memory manager 81 increases the size of the cache area 205 as the size of the free memory area 207 is larger.

When loading any one of the boot files from the general storage area 211, the cache manager reads ahead a boot file, which is to be subsequently loaded, into the cache area 205. The cache area 205, into which the boot file is read ahead, stores data having the same structure as the file image having been stored in the general storage area 211. While the boot file read ahead into the cache area 205 is thereafter loaded into the working sets 203a to 203c and then erased, the amount of the boot file that can be read ahead with a single I/O access to the HDD 17 is limited to within a range of the capacity of the cache area 205.

If there is an objective boot file in the cache area 205 when the boot file is loaded from the general storage area 211 after the running of the process, the file system 71 loads the boot file from the cache area 205 and stores the boot file as a memory image into the working sets 203a to 203c. The memory image is an executable file with a library linked. In the case where a boot file having a predetermined amount is read into the cache area 205 with a single I/O access and then loaded into the working sets 203a to 203c, the frequency of the I/O access is lower than in the case of loading a boot file into the working sets 203a to 203c by performing an I/O access for each boot file and thus the seek time of the head of the HDD 17 can be reduced, by which the loading can be completed in a short time.

If the size of the working sets 203a to 203c can be reduced, the size of the free memory area 207 increases, thereby enabling the cache area 205 to be increased, leading to a reduction in the load time. A decrease in the working set sizes of all processes, however, causes overhead due to an I/O access for paging processing because a page fault frequently occurs at the running of the process, which delays the boot time. In the present embodiment, with respect to the working sets belonging to a suspended process, as many memory pages as possible are swapped out and the maximum working set size is decreased in order to increase the cache area 205 while inhibiting an occurrence of a page fault. The procedure thereof will be described below with reference to FIGS. 5 to 7.

Procedure to generate RPL

In the present embodiment, processes loading a boot file are controlled to be suspended or run in accordance with the RPL 107. A program that is run on-demand, and a program called only from a program run on-demand, are suspended during booting. They are then are resumed on-demand after booting, whereby the boot time can be reduced, while ensuring the running of the suspended programs. Herein, on-demand means running in response to a user's operation and running called by a program that is run in response to a user's operation, as opposed to automatic running. Table 1 illustrates a program as a target of suspend/resume in the present embodiment.

TABLE 1

| PROGRAM TYPE | BOOT-UP TYPE | CONTROL TARGET | GROUP |
| --- | --- | --- | --- |
| OS KERNEL | AUTO | | 1 |
| OS SERVICE/DEVICE DRIVER/SUBSYSTEM | AUTO ON DEMAND | o | 2 3 |
| APPLICATION/ SERVICE/DEVICE DRIVER | AUTO ON DEMAND | o | 4 5 |

The programs illustrated in FIG. 2 can be classified into five groups as shown in Table 1. Table 1 indicates classifications for the five groups, including a classification for boot-up as to whether it is included in a boot file and a classification as to whether it becomes a control target for suspend/run. A program whose boot-up type is AUTO corresponds to a boot file. A program whose boot-up type is ON DEMAND is not a boot file. A kernel belonging to a first group includes a program essential to operate the computer 10, which is excluded from the control target for suspend/run. Thus, the kernel is loaded and run in the order designated by the OS during booting. A program belonging to a second group, which is included in a boot file and set so as to be automatically loaded among a service, a device driver, and a subsystem of the OS, is a control target for suspend/run.

A program belonging to a third group, which is set so as to be run on-demand among a service, a device driver, and a subsystem of the OS, is excluded from a control target for suspend/run. A program belonging to a fourth group, which is set so as to be automatically loaded among an application, a service for an application, and a device driver introduced later, is a control target for suspend/run. A program belonging to a fifth group, which is set so as to be run on-demand among an application, a service for an application, and a device driver introduced later, is excluded from a control target for suspend/run.

Figure 5:
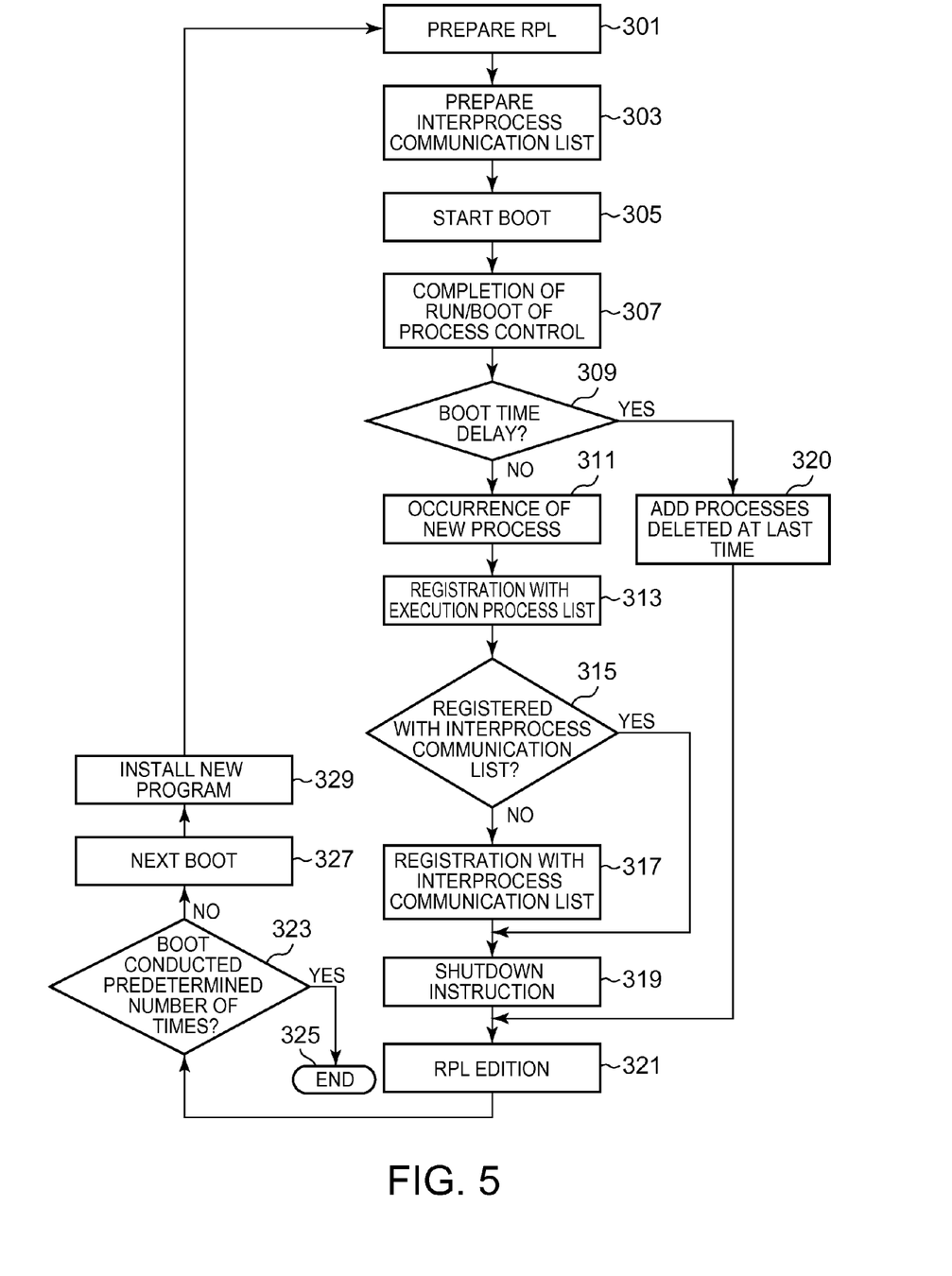
FIG. 5 is a flowchart illustrating a procedure for generating an RPL.

FIG. 5 is a flowchart illustrating a procedure for generating an RPL. The RPL 107 is referenced by the process control unit 103 in order to control suspend/run of processes loading a boot file. At block 301, the RPL 107 is loaded into the main memory 13. As the number of processes registered with the RPL 107 becomes smaller, the boot can be completed in a shorter time so as to configure a running environment for a specific application. If a process necessary for the computer operation is excluded from the RPL 107, however, the operation of the computer might stop, become unstable, or delay the boot, and therefore processes to be registered have to be selected appropriately.

In the present embodiment, the RPL 107 is created while processes to be registered are extracted on the basis of the usage of the computer 10. First, the process control unit 103, with the RPL 107, registers all processes stored in the HDD 17 and corresponding to executable programs registered with the registry of the configuration manager 73. At block 303, a blank interprocess communication list 111 with any process dependence not registered therein is loaded in the main memory 13.

At block 305, the computer 10 is switched on to start boot. By repeating the procedure in FIG. 5, processes to be targets of suspension are deleted from the RPL 107. At block 307, the process control unit 103 conducts controls for suspend/run for the processes generated during booting in accordance with the RPL 107, the details of which will be described later referring to FIG. 7.

After the completion of boot, at block 309, the process control unit 103 determines whether or not this boot time is longer than the last boot time by a predetermined time length or more. The procedure of FIG. 5 repeatedly conducted by executing the boot a plurality of times possibly leads to a decrease in boot time at first, but an increase in boot time at a certain timing. At this time, the increase in boot time means that a process to be registered with the RPL 107 has been deleted therefrom and was suspended during booting.

When the boot time is not delayed, the processing proceeds to block 311. At block 311, when a user starts to use the computer, a process is generated relating to a program other than a boot file, such as an application newly run after booting. Such a process includes a process to run a program in response to a user's operation and a process called by the process for running. At block 313, the process control unit 103 acquires all processes run by that time from the process management unit 63 and registers the same with the execution process list 105.

At block 315, the interprocess communication monitoring unit 109 acquires information on interprocess communication from the shared resource management unit 75, and determines whether or not a dependence, including a caller process and a callee process, is registered with the interprocess communication list 111. If it is not registered, at block 317, the interprocess communication monitoring unit 109 registers the process dependence with the interprocess communication list 111.

At block 319, a shutdown instruction is issued to the computer 10 through the input device 15. In accordance with the shutdown instruction, at block 321, the RPL management unit 113 selects a process to be deleted from the RPL 107. The RPL management unit 113 acquires a list of the processes corresponding to all executable programs stored in the HDD 17 and registered with the registry of the configuration manager 73, compares the same with the execution process list 105, and deletes, from the RPL 107, not-run processes that are grasped but not yet run.

The not-run processes include a process corresponding to a loaded program and a process corresponding to a not-loaded program. The RPL management unit 113 further references the interprocess communication list 111 and the configuration manager 73 to determine whether a process is a callee process. A callee process may be a process that is not registered with the registry or loaded as a target of auto-run, but is called by a process, such as Explorer of the OS, for running a program called by a program run in response to a user's operation, and deletes such a process from the RPL 107.

This process is not a boot file that is automatically executed and therefore does not need to be registered with the RPL 107. Thus, the processes left in the RPL 107 include mainly a process of a program that is booted for running as a mechanism of the OS among all the executable processes and a process that is called by the process for running. Processes that do not interfere with the operation of the computer 10 when the processes are run on-demand in response to a user's operation are deleted from the RPL 107.

Figure 6:
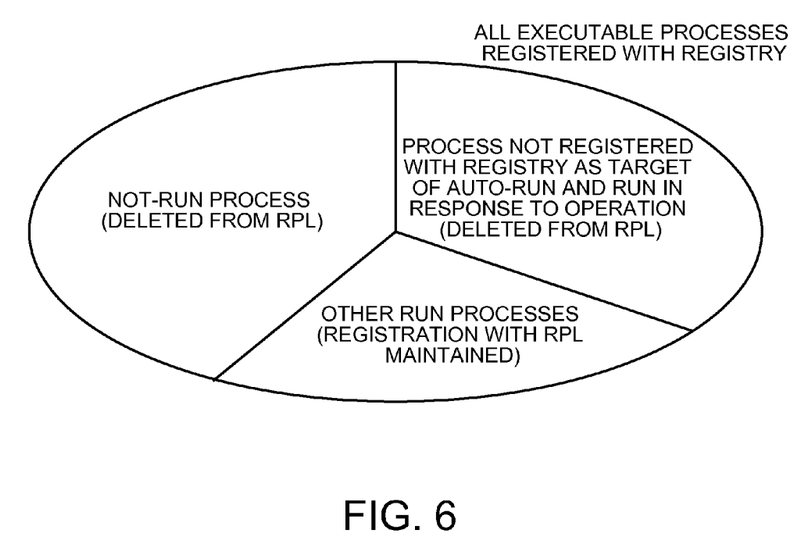
FIG. 6 is a diagram illustrating a state of deleting an unnecessary process from all executable processes to generate an RPL.

FIG. 6 illustrates a state of deleting a predetermined process from all executable processes to create the RPL 107. FIG. 6 illustrates that the processes corresponding to all executable programs registered with the registry at this boot time are configured with a not-run process, a process which is out of an auto-run target and is run on-demand in response to a user's operation, and other run processes. In this case, "other run processes" are registered with the RPL 107.

At block 309, if this boot time is delayed, it is expected that an important process deleted from the RPL 107 used for this boot is in a suspend state and thus cannot be run. At block 320, the RPL management unit 113 returns, to the RPL 107, processes deleted from the RPL 107 during the time between the last boot and this boot. Then, at block 321, the RPL management unit 113 can make the processes, which have been thus returned, out of a deletion target in the next boot or later. A user can set, through the boot management unit 101, a predetermined number of OS core processes as processes that are prohibited from deletion from the RPL 107 beforehand.

At block 323, the boot management unit 101 determines whether boot has been conducted a predetermined number of times. The predetermined number of times is preferably decided so as to include all operating environments where a user may use the computer such as browsing of Web sites, document preparation, image data editing, and reproduction of moving images. When the boot has been completed the predetermined number of times, minimum required processes for boot that can be ready to any user's usage environment are registered with the RPL 107. After the computer is switched on, control for suspend/run is conducted using the RPL 107, whereby the computer can arrive at such an operating environment in a short time. At block 325, the RPL management unit 113 terminates editing of the RPL 107, and the process control unit 103 uses the edited RPL 107 to run process control at the next boot. A method for process control will be described with reference to FIG. 7.

At block 327, in order to further continue the editing of the RPL 107, the next boot is conducted after shutdown of the computer 10. Then, at block 329, a new program may be introduced into the computer 10 in some cases. The RPL management unit 113 makes all of the newly introduced programs after the completion of the editing of the RPL 107 and service programs called only from the programs not registered with the RPL 107.

Alternatively, the RPL management unit 113 may make all programs introduced after introduction of the OS into the computer 10 not registered with the RPL 107. This is because suspension of such programs does not interfere with the boot of the OS that has operated normally until that time, and such programs can be run on-demand. At the next boot, the procedure returns from block 329 to block 301, whereby the RPL management unit 113 edits the RPL 107 in the next operating environment.

[Procedure for Increasing Free Memory Amount by using RPL]

Figure 7:
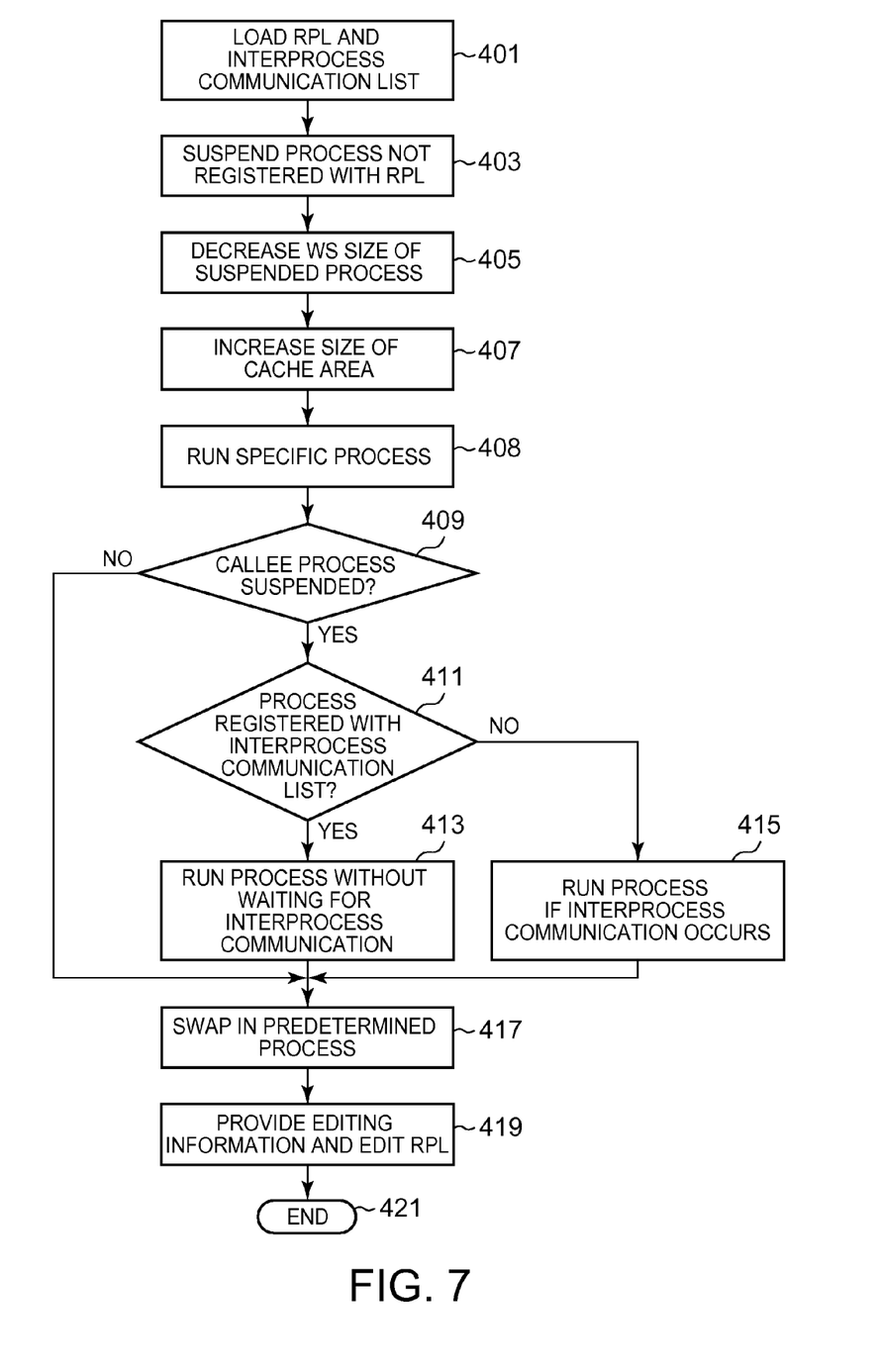
FIG. 7 is a flowchart illustrating a procedure for increasing the free memory amount of the main memory by using an RPL.

FIG. 7 is a flowchart illustrating a procedure for increasing a free memory amount of the main memory 13 by using the RPL 107, created in accordance with the procedure illustrated in FIG. 5. At block 401, the computer 10 is switched on, and the RPL 107 created until the last boot in accordance with the procedure in FIG. 5, together with the interprocess communication list, 111 are loaded into the main memory 13. The RPL 107 registers a list of processes that are permitted to run during booting. The interprocess communication list 111 registers a list indicating a dependence of a caller process and a callee process that have conducted interprocess communication before the last shutdown.

First, an initialization program called Power On Self Test (POST) of BIOS stored in the BIOS ROM 21 is read to the main memory 13 for running. The initialization program diagnoses a boot device or initializes the same. Next, the BIOS searches for the HDD 17 storing a boot file. The boot file is configured with programs of groups 1, 2, and 4 in Table 1.

The BIOS loads a Master Boot Record (MBR) stored in a first sector of the HDD 17 into the main memory 13 and transfers control thereto. The MBR searches for a partition that can be booted from a disk, loads a bootstrap loader residing at a first sector (boot sector) thereof into the main memory, and transfers control thereto. Thereafter, following the bootstrap loader, programs of groups 1, 2, and 4 are read to the main memory 13 in a predetermined order.

An OS performing preemptive multitasking is also configured to perform preemptive task switching during booting. In order to automatically load programs of the OS from the HDD 17 during booting, the OS generates a plurality of processes. Further, Explorer of the OS also generates a process for automatically loading a start-up program or a program registered with a registry. On the process list 65 is written a process ID of a process generated by executing an API function.

The generated process is run while transitioning between a ready state and a run state under the control of the process scheduler 67, thus loading a corresponding program code for each time slice. A program, upon being loaded, starts running automatically or waits for being called from another process in a loaded state. In the middle stage of booting, the boot system 100 is loaded and run.

The process control unit 103 does not conduct any control for the generation of a process for booting a boot file. Thus, since all processes for loading are generated for all boot files, the boot files can secure a shared resource necessary for interprocess communication. When the process securing the shared resource is called by another process during suspension, the process can be triggered to resume by the generation of the interprocess communication.

When loading the boot file from the general storage area 211 of the HDD 17, the file system 71 references the cache area 205. If there is an objective boot file therein, the file system 71 starts loading from the boot file. The loading from the cache area 205 can be completed in a shorter time due to the minor overhead of an I/O access to the HDD 17 in comparison with loading from the general storage area 211. The file system 71 is able to erase a boot file that has been read from the cache area 205 to secure the area as a read-ahead area for another boot file.

The file system 71 checks whether there is an allowance in the cache area 205 when loading any boot file from the general storage area 211. If there is an allowance in the cache area 205, boot files likely to be loaded after the last boot are read ahead as file images from the general storage area 211 into the cache area 205 using the order of loading the boot files checked since the last boot.

A loaded process is run to further load another process or to call an already-loaded process. The loaded process includes a process which transitions to a running wait state and is not run until some event occurs or the process is called by another process. The memory manager 81 allocates working sets having a predetermined size set by default to all processes generated for loading.

The size of a working set is defined by the maximum working set size and the minimum working set size. The memory manager 81 sets the cache area 205 to a part of the free memory area 207. The process of a boot file is generated without any limitation and the memory manager 81 gives working sets having the same size to the processes of all boot files. Therefore, the size of the free memory area 207 decreases gradually and the size of the cache area 205 also decreases. As a result, the amount of the boot files able to be read ahead into the cache area 205 is restricted.

After a predetermined number of processes of the OS are generated, at block 403, the process control unit 103 starts to control the processes while referencing the RPL 107. The process control unit 103 compares the processes registered with the RPL 107 and the processes described in the process list 65. When the process control unit 103 finds, in the process list 65, a process not registered with the RPL 107, the process control unit 103 executes a specific API function with respect to the process scheduler 67 to make the process transition to a suspend state.

The process at the time point of transitioning to the suspend state has completed the loading of the scheduled program and is in a state immediately before or immediately after starting the running. Thereafter, the process that has transitioned to the suspend state keeps that state unless the process control unit 103 executes an API function for resuming. As a result, the suspended process is placed in a run state for a short time period corresponding to the allocated time slice from the generation to suspension.

When finding a process registered with the RPL 107 in the process list 65, the process control unit 103 does not conduct any control over the process. Thus, only the processes registered with the RPL 107 transition between a run state and a ready state under the control of the scheduler 67, so that the boot proceeds. Since the number of processes registered with the RPL 107 is much smaller than the number of processes described in the process list 65, the boot time is reduced.

For the process in the suspend state, the memory page secured in the working set does not need to be secured in the main memory 13 when the process is generated. Moreover, if it is unnecessary to secure the memory page in the main memory 13, the free memory area 207 can be increased by decreasing the size of the working set, which has been set by default. At block 405, the process control unit 103 requests the memory manager 81 to decrease the maximum working set size, set by default, for the process that has transitioned to the suspend state.

The unused memory page in the working set does not immediately interfere with the running of the process when the process is resumed even if the unused memory page is swapped out. Moreover, as long as the swapped-out memory page is swapped in before the suspended process is resumed, the running of the process is not delayed when it is resumed, even if all memory pages are swapped out.

Further, some programs do not need to be swapped in before resuming by placing priority on reducing the boot time because if a page fault occurs, it is not a problem practically when the CPU 11 accesses the programs. The process control unit 103 requests the memory manager 81 to decrease the maximum working set size as far as possible within a range where the OS allows. For example, the process control unit 103 requests the memory manager 81 to decrease both of the maximum working set size and the minimum working set size to zero or to decrease the maximum working set size up to a level equal to the minimum working set size.

The requested memory manager 81 deletes unused memory pages on a priority basis in order to decrease the maximum working set size. Further, when there arises a need for swapping out in-use memory pages, the memory manager 81 swaps out a required amount of memory pages according to the LRU algorithm, or swaps out all memory pages and then executes an inner function to decrease the working set size. The range of memory pages able or permitted to be swapped out depends on the architecture of the OS or the declaration of the program concerned. If the working set size is decreased, the free memory area 207 increases.

Along with the increase in the size of the free memory area 207, at block 407, the memory manager 81 increases the size of the cache area 205. When loading any one of the boot files after the size of the cache area 205 is increased, the file system 71 confirms the size of the current cache area 205 and the size of the boot file and then reads ahead subsequent boot files to a maximum extent into the cache area 205.

When loading boot files, the file system 71 loads the boot files from the cache area 205 if the boot files are stored therein. Otherwise the file system 71 loads the boot files from the general storage area 211. The memory manager 81 creates working sets having the same structure independently of whether the boot files are loaded from the cache area 205 or loaded from the general storage area 211 for a process for loading the boot files.

At block 408, a specific process (caller process), which has been generated to run an application, or the like, before the completion of the boot or after the completion of the boot, calls another process (callee process). At block 409, the process control unit 103 makes an inquiry to the process management unit 63 as to whether the callee process is suspended or not. If the callee process is not suspended, the processing proceeds to block 417. If the callee process is suspended, since it has to be resumed, the processing proceeds to block 411, where the process control unit 103 makes an inquiry to the interprocess communication monitoring unit 109 as to whether the caller process is registered with the interprocess communication list 111 or not.

If it is determined that the caller process is registered with the interprocess communication list 111, at block 413, the process control unit 103 resumes the callee process corresponding to the caller process described in the interprocess communication list 111 without waiting for interprocess communication. The resumed process is transitioned to a ready state by the process scheduler 67. As a result, the suspended process can be run without consuming overhead when the process is resumed after the occurrence of the interprocess communication.

If it is determined at block 411 that the process not registered with the interprocess communication list 111, at block 415, the process control unit 103 executes a specific inner function, triggered by the interprocess communication monitoring unit 109 recognizing the occurrence of interprocess communication to the callee process, and makes the process scheduler 67 resume the callee process. In this case, the time until resuming is longer than the procedure of block 413 because of starting the interprocess communication or of access to the shared resource management unit 75.

The maximum working set size is not increased only by the transition of the process to the ready state. In the case where the process requests additional memory pages the memory manager 81 allocates additional memory pages up to the maximum working set size, set by default. Since a memory page included in a working set belonging to a resumed process is swapped out, a page fault occurs when the CPU 11 accesses the memory page.

To prevent this, preferably the memory page is swapped in before a suspended process is resumed or when the process is resumed. At block 417, the process control unit 103 requests the memory manager 81 to swap in the memory page swapped out at suspension. The swap-in timing may be any time as long as it is between the suspension of the process and the resuming thereof, but it is preferable to perform the swap-in immediately before the process is resumed as far as possible since swap-in causes an increase in the working set size which leads to a decrease in the free memory amount.

The swap-in timing may be, as described at block 413, timing immediately before the caller process described in the interprocess communication list 111 is called and the callee process resumes, timing after an elapse of a certain period of time after suspension which occurs for each process, or timing when the boot is completed. Moreover, the process for displaying a window needs to be run in a short time at the time of a user's access, and therefore preferably the swap-in is performed particularly before resuming. Alternatively, it is also possible to employ a method in which the working set size of a process for displaying a window is not decreased.

If the process for displaying a window is suspended, the process control unit 103 sends a window message to a process in suspension having a window handle. The process that has received the window message swaps in a part of the memory page, which has been stored in a paging file of the virtual memory area 213 in order to execute a code for processing the window message, to the main memory 13. The timing when the process control unit 103 sends the window message may be immediately after the suspension.

At block 419, a user determines whether or not the editing of the RPL 107 is necessary via the interface screen provided by the boot management unit 101. If the user determines that the editing of the RPL 107 is necessary, the boot management unit 101 searches for a process with a less running frequency among the processes registered with the RPL 107 through the execution process list 105 and displays the same on the LCD 19.

The display contents can be a list of types of processes, such as a process that is never run after the program is installed, a process that is run only immediately after the installation, a process that is never run within the latest one week, and a process that is never started within the latest ten boots. When the user determines and selects a process that can be deleted from the RPL 107, on the basis of the displayed contents, the RPL management unit 113 deletes the process from the RPL 107.

In the procedure of FIG. 7, when the suspended process is resumed, the maximum working set size is not increased, but the memory manager 81 allocates the requested memory pages up to the maximum working set size. As another method, the process control unit 103 is able to request the memory manager 81 to increase the maximum working set size up to a default value at the time of resuming the process.

As an example, the present invention is applicable to Windows® OS. The present invention, however, is widely applicable to any OS which employs a virtual storage of paging method and increases the size of a free memory area by decreasing the total size of the working sets allocated to the respective processes and further increases a cache area along therewith. Therefore, the detailed method of memory management described in the present specification is an example for describing the present invention, and the present invention is applicable even to a case where the OS employs any other architecture in a method of managing the working set size or in a method of increasing the cache area.

Although the above procedure has been described by giving an example of reducing the boot time by decreasing the working set size of a suspended process at booting to increase a cache area, the increased free memory area is also applicable to other areas. For example, the suspended process includes a process not run during power-on subsequent to the booting. Conventionally, a certain working set has been allocated to that kind of process, which has placed a restraint on the working set size of other processes.

In the present invention, however, the maximum working set size of the suspended process is minimum even after the completion of the boot and thus the free memory area increases correspondingly. Therefore, it is possible to give working sets having a size as large as possible to other processes or to increase a cache area used by a file system at the time of reading a file after booting.

While the present invention has been described above by using specific embodiments illustrated in accompanying drawings, the present invention is not limited to the embodiments illustrated in the drawings, and naturally any conventionally known configuration may be used as long as the effect of the present invention is achieved.

Description of Symbols
  10 Computer
  13 Main memory
  17 HDD
  61 Kernel
  100 Boot system
  201a to 201c Virtual address space
  203a to 203c Working set
  205 Cache area
  207 Free memory area
  211 General storage area
  213 Virtual memory area The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for reducing boot time comprising the steps of:
  starting, by use of a processor, a boot of a computer with an operating system capable of reading ahead a boot file into a cache area set in a free memory area of a main memory and changing a size of the cache area according to a size of the free memory area;
  generating processes for loading the boot file into the main memory;
  allocating working sets having a predetermined size to the generated processes by the operating system;
  suspending a predetermined process selected out of the processes for loading the boot file;
  swapping out a memory page of the suspended predetermined process to decrease a size of a working set for the process, wherein the decreased working set size is a minimum working set size set by default to each process by the operating system; and
  increasing the size of the cache area according to the decreased working set size.

2. The method of claim 1, further comprising the steps of:
  reading ahead the boot file into the cache area whose size is increased; and
  generating a process for loading the boot file stored in the cache area.

3. A method of expanding a free memory area comprising the steps of:
  starting, by use of a processor, a boot of a computer comprising a storage device with a boot file stored thereon, a main memory, and an operating system;
  generating processes for loading the boot file into the main memory;
  allocating working sets having a predetermined size to the generated processes by the operating system;
  suspending a predetermined process selected out of the processes for loading the boot file; and
  swapping out a memory page of the suspended predetermined process to decrease a size of a working set for the process, wherein the decreased working set size is a minimum working set size set by default to each process by the operating system.

4. A computer comprising:
  a processor;
  a main memory;

a storage device, with a boot file stored therein, including an operating system;

a virtual memory;

a first means for selecting a predetermined process to be suspended, from all processes that load the boot file into the main memory; and a second means for allocating working sets having a predetermined size to processes for loading the boot file, suspending the predetermined process selected by the first means, and swapping out a memory page of the suspended process to decrease a size of a working set for the process, wherein the decreased working set size is a minimum working set size set by default to each process by the operating system.

5. A program product comprising a non-transitory computer readable storage medium that stores code executable by a processor, the executable code comprising code to perform:

starting a boot of a computer provided with a storage device with a boot file stored thereon, a main memory, and an operating system;

generating processes for loading the boot file into the main memory;

allocating working sets having a predetermined size to the generated processes by the operating system;

suspending a predetermined process selected out of the processes for loading the boot file; and swapping out a memory page of the suspended predetermined process to decrease a size of a working set for the process, wherein the decreased working set size is a minimum working set size set by default to each process by the operating system.

6. The program product of claim 5, further comprising the step of increasing the size of a cache area used by the operating system according to the decreased working set size.

7. The program product of claim 5, further comprising the step of swapping into main memory the memory page that has been swapped out before the suspended process resumes.

8. The program product of claim 7, wherein the swapping-in step is performed after an elapse of a certain period of time after the process is suspended.

9. The program product of claim 7, wherein the swapping-in step is performed when the boot is completed.

10. The program product of claim 7, wherein, in the swapping-in step, the memory page of a suspended callee process is swapped in when a caller process is generated with reference to an interprocess communication list describing a relation between the caller process and the callee process.

11. The program product of claim 10, wherein the swapping-in step includes the step of sending a window message to a process having a window handle.

12. The program product of claim 11, wherein the swapping-in step is performed immediately after the process having the window handle is suspended.

13. The program product of claim 5, wherein the predetermined process includes a process that is run on-demand in response to a user's operation.

14. The program product of claim 5, wherein the predetermined process includes a process for loading a program that is not run at booting among all programs registered with a registry.

15. The computer of claim 4, wherein:

the main memory includes a cache area; and the second means expands the cache area according to the decrease in the working set size.

16. The computer of claim 15, wherein the first means requests the second means to resume the suspended process.

17. The computer of claim 16, wherein the first means swaps in the memory page swapped out through the second means before a page fault occurs on an access from the processor.

18. The computer of claim 17, wherein the first means requests the second means to swap in the swapped-out memory page into the main memory before the suspended process resumes.

19. The computer of claim 17, wherein the first means requests the second means to send a window message to a process having a window handle.

* * * * *